United States Patent

[11] 3,557,757

| [72] | Inventor | Cletus A. Brooks |
| | | 6670 Brooks Highway, Onsted, Mich. 49265 |
| [21] | Appl. No. | 743,667 |
| [22] | Filed | July 10, 1968 |
| [45] | Patented | Jan. 26, 1971 |

[54] AUTOMATIC SELECTIVE ANIMAL FEEDER
6 Claims, 10 Drawing Figs.

[52] U.S. Cl. .................................................. 119/51,
340/152, 340/258, 343/225
[51] Int. Cl. ................................................. A01k 05/02
[50] Field of Search ............................................ 119/51-
—59, 61, 62, 63, 72—81; 340/152X, 258X, 171, 196; 343/225X

[56] References Cited
UNITED STATES PATENTS

| 3,131,673 | 5/1964 | Rudd. | |
| 3,157,157 | 11/1964 | Clay et al. | 119/51.11 |
| 3,168,888 | 2/1965 | Brodrick | 119/51 |
| 3,260,034 | 7/1966 | Major. | |
| 1,967,022 | 7/1934 | Chandler | 119/54 |
| 2,563,321 | 8/1951 | Dugan | 119/51 |
| 2,651,291 | 9/1953 | Duke | 119/54 |
| 2,715,887 | 8/1955 | Flannery et al. | 119/52 |
| 3,313,272 | 4/1967 | Moloney | 119/51.11 |
| 3,465,724 | 9/1969 | Broadbent | 119/51 |

*Primary Examiner*—Aldrich F. Medbery
*Attorney*—Beaman & Beaman

ABSTRACT: An automatic feeding system for livestock which permits selective animals to be fed supplemental foods wherein those animals to be selectively fed wear actuating means about their necks such that upon the proper animal inserting its head into a feed trough, the actuating means actuates a conveyor which transfers food from a container or reservoir into the feed trough as long as the animal's head is located in the trough. The disclosure describes several electrical control arrangements which may be used in the practice of the invention.

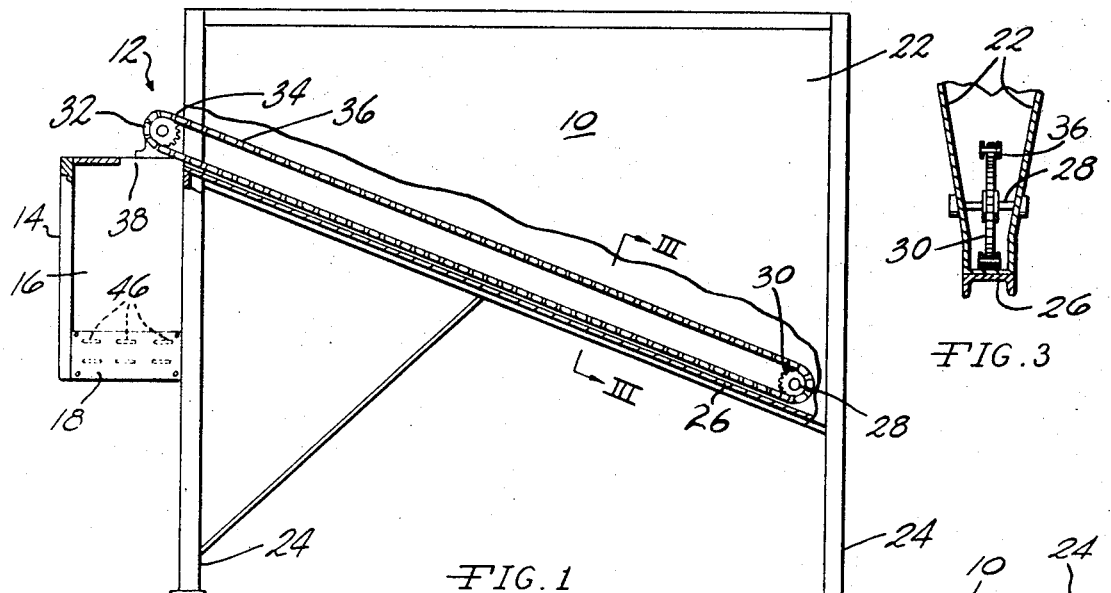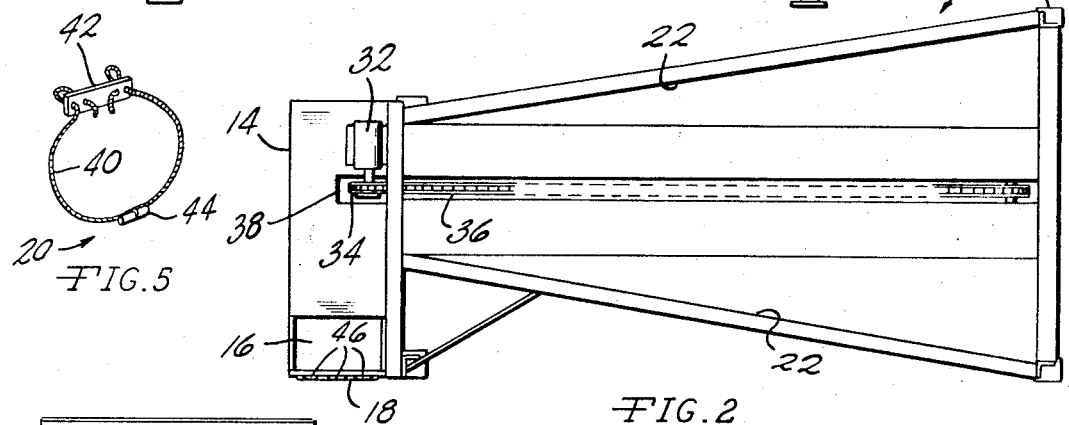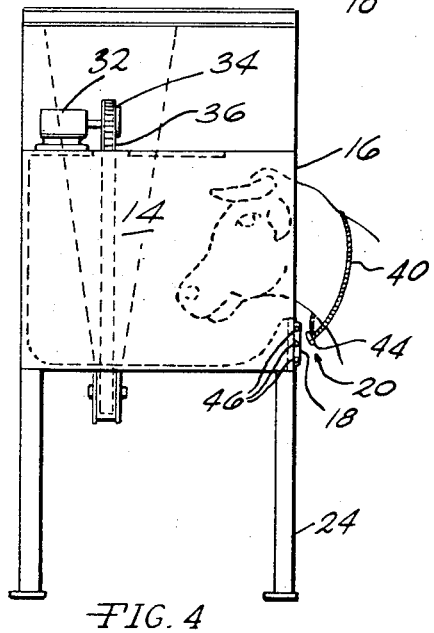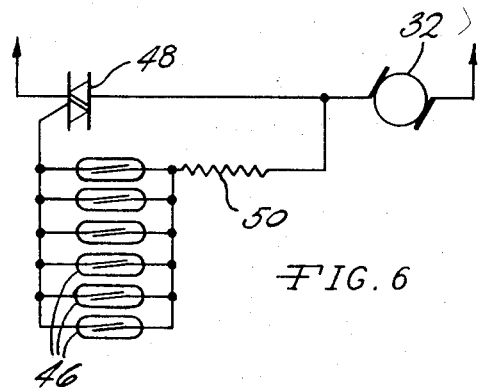

3,557,757

AUTOMATIC SELECTIVE ANIMAL FEEDER

BACKGROUND OF THE INVENTION

The invention pertains to the field of animal husbandry pertaining to the feeding of animals, and in particular pertains to automatic feeding means actuated by the animal.

In the raising of certain types of livestock, for instance, in dairy farming and beef production, it is often desired to feed the animals supplemental feed at particular times during growth or the milk producing cycle. For instance, at certain periods of the animal's development high protein diets are of advantage, and in milk production certain periods of the cow's milk producing cycle require supplemental feeds in order to obtain maximum production.

It is the common practice in modern dairy and beef farms to confine the animals in feed lots wherein the animals are fed hay, fodder and other conventional feed, and are not permitted to have access to natural pasture. In the feed lot manner of raising milk cows and cattle the ability to provide supplemental feed to selected animals is particularly advantageous.

Several devices have been proposed for permitting selective feeding of animals for the purposes set forth above. The U.S. Pat. Nos. 3,180,321 and 3,303,822 are directed to selective animal feeder arrangements. The first of these patents uses a transmitter hung from the neck of the animal to operate a gate to provide access to a feed trough. The second of these patents uses the weight of the animal to determine whether or not the animal is entitled to supplemental food.

The prior art devices for permitting the selective feeding of animals do not permit the versatility and reliability desired with this type of device. A radio transmitter type of control is expensive, difficult to maintain, and the use of a gate with the feed trough causes a number of problems with respect to controlling the animal's access to the feed, as well as requiring complicated control and mechanical movement devices. The weight controlled apparatus is also very expensive to manufacture and install, and in that factors other than the animal's weight are often important with respect to the need for supplemental foods, a weight control arrangement is very limited in its practical use.

SUMMARY OF THE INVENTION

The apparatus in accord with the invention includes a feed container or reservoir in which the supplemental animal food is stored. This container would normally be placed in the animal feed lot. Feed transfer means are associated with the container, and may consist of a chain, feed screw or other conventional conveying system well known in the agricultural arts. An electric motor is preferably used in conjunction with the feed transfer apparatus.

A feed trough is disposed adjacent the container, and is preferably mounted upon the container framework. The feed trough includes an access opening through which the animal inserts its head when it desires the supplemental feed. A panel housing a sensing element is located directly below the trough access opening, and suitable sensing means are disposed in this panel for energizing an electric feed transfer motor to permit the supplemental feed to be deposited in the trough when the proper animal inserts its head into the feed trough.

In order to control which animals are to receive the supplemental feed, an actuating member is hung from the neck of those animals which are to be selectively fed. The actuating member can be in the form of a permanent magnet, ferrous metal, a tuned radio frequency circuit, an infrared reflector, or other type of device which can be readily adapted to the application.

Upon the animal inserting its head into the feed trough, the actuating member hanging from a band passing around the animal's neck will be disposed adjacent the access opening panel, and the sensing element located thereon. Thus, upon an actuating member bearing animal inserting its head into the access opening the transfer motor will be energized transferring feed from the container to the trough.

The rate of transfer of feed into the trough is preferably substantially equal to the rate at which the animal will normally consume feed. Thus, the animal will maintain its head within the feed trough as long as it desires food. As soon as the animal's head is withdrawn from the feed trough the transfer motor ceases operation due to the removal of the actuating member from the sensing element.

It is therefore an object of the invention to provide a selective feeder system for animals which is reliable in operation, and relatively inexpensive to manufacture and maintain.

Another object of the invention is to provide a selective animal feeder system which permits selective animals to be supplementally fed, and eliminates the wasting of the supplemental feed, and limits the consumption of such feed to those animals for which it is intended.

An additional object of the invention is to provide a selective animal feeder system utilizing a sensing element of the proximity type wherein an actuating member may be disposed adjacent the sensing element in order to energize the sensing element and its associated circuit to permit feed to be introduced into the trough.

BRIEF DESCRIPTION OF THE DRAWINGS

The aforementioned objects of the invention will be apparent from the following description and accompanying drawings wherein:

FIG. 1 is an elevational view, partly sectioned, illustrating a combined feed container and trough in accord with the invention, FIG. 2 is a top, plan view of the apparatus of FIG. 1, FIG. 3 is an enlarged, detailed, elevational, sectional view through the lower region of the conveyor and feed container as taken along Section III–III of FIG. 1, FIG. 4 is an end, elevational view of the feeder of FIG. 1 as taken from the left, illustrating the presence of a cow's head in the feed trough access opening, FIG. 5 is a perspective view of the band and permanent magnet actuator used with one embodiment of the invention, FIG. 6 is a diagram of the multiple reed switch control circuit used in accord with the invention.

DESCRIPTION OF THE PREFERRED EMBODIMENT

Figure 7:
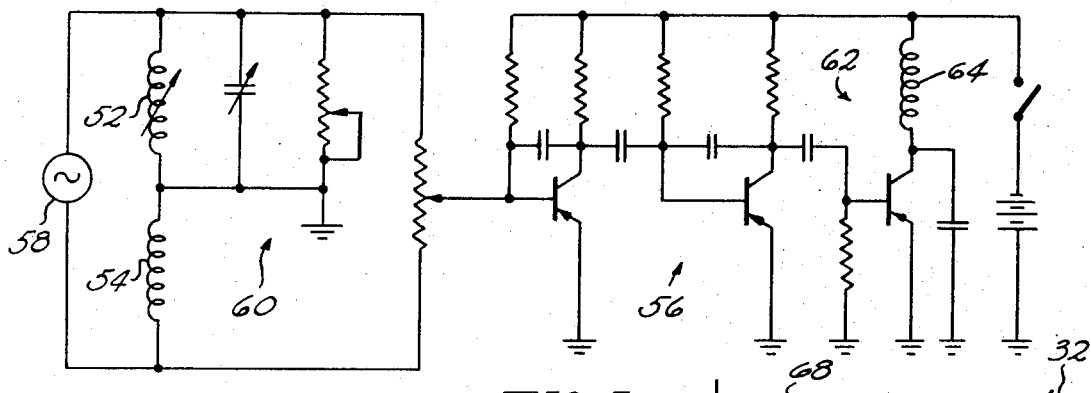
FIG. 7 is an electrical circuit diagram of an inductance bridge-type circuit used in accord with the invention.

The invention includes a feed container or reservoir generally indicated at 10 in the drawings. Feed transfer means, generally indicated at 12, are used to convey the supplemental feed from the container 10 to a feed trough 14. The feed trough includes an access opening 16, and a panel 18 is disposed adjacent the lower region of the access opening in which the transfer means control sensing element is preferably mounted. An actuating member, generally indicated at 20 is hung from the neck of the animal to which the supplemental feed is to be fed.

In greater detail, as shown in FIG. 1, the container 10 may be of a generally V configuration consisting of converging sidewalls 22 mounted upon supporting legs 24. In the disclosed embodiment the lower wall 26 of the container is inclined at an angle extending upwardly to the left, FIG. 1.

The container 10 has a rotatable shaft 28 extending therethrough at its lower regions upon which a chain sprocket 30 is mounted. An electric motor 32 is mounted at the left of the container above the feed trough, and includes a speed reduction transmission rotating a chain sprocket 34 in alignment with the sprocket 30. The feed conveyor consists of a chain 36 passing over the sprockets 30 and 34, and it will be appreciated that the sprockets are so located that the lower portion of the chain rests upon the bottom wall 26 of the container, while the upper or return portion of the chain will pass through the feed in the container above the wall 26, and thereby agitate the feed and minimize the possibility of the feed "bridging." The direction of operation of the sprockets when transferring feed from the container to the feed trough is clockwise, FIG. 1.

The feed trough 14 includes an upper opening 38 through which the feed drops from the container wall 26 as carried by the lower portion of the chain 36 and falls into the feed trough during energization of the motor 32. The feed trough is accessible to the animal through the vertical access opening 16 and the feed trough may be provided with suitable radiused corners in order to simplify cleaning, and minimize wasted food.

The lower portion of the feed trough immediately below the access opening includes the panel 18, preferably formed of a nonmagnetic material, such as plastic or Fiberglas. The feed trough, and its associated access opening 16, are so formed that the animal when attempting to reach the food within the trough will position the lower part of its neck adjacent the panel 18.

The actuator for the motor 32 is hung from the animal's neck by means of a band 40. The band 40 is preferably in the form of a nylon rope, and the ends of this rope may be inserted through an adjustable retainer 42, FIG. 5 whereby the circumference of the band may be adjusted to suit the individual animal. The actuating member for the electric motor is mounted upon the lower region of the band 40, and in FIG. 5 is in the form of a permanent magnet 44 in that this embodiment of the actuating circuit of the invention will be described as the preferred form.

The sensing elements for the control circuit for the motor 32 consists of a plurality of reed switches 46, six in the disclosed embodiment, located upon the panel 18 in a pattern that will be apparent from FIG. 1. The reed switches 46 are of the conventional type consisting of a pair of magnetic responsive contact reeds located within an evacuated or inert atmosphere. Upon a magnetic force being located adjacent a reed switch, the contacts thereof will close, and electrical current is capable of passing through the switch.

FIG. 6 illustrates the simplified circuit using reed switches 46 in the panel 18. In the circuit of FIG. 6 a low voltage operated power switch known as a thyrsistor is illustrated at 48 in series across the power supply with motor 32, and the reed switches 46 are connected in parallel, through a resistance 50 to form a series connection with the thyrsistor.

Upon a cow inserting its head into the trough access opening 16, as illustrated in FIG. 4, the permanent magnet 44 mounted upon the band 40 will be disposed adjacent the panel 18 and adjacent at least one of the reed switches 46 and close the nearest switch, or switches, which closes thyrsistor 48 and thereby energizes the motor 32. As the motor 32 rotates the chain 36 will draw feed into the feed trough 14 from the container 10 at a rate substantially equal to that at which the food is consumed by the animal. Upon the animal's hunger being satisfied it will withdraw its head from the access opening 16, which will remove the magnet 44 from proximity with the reed switches 46, and permit the closed reed switches to reopen and deenergize the switch 48 and motor 32. Thus, only those animals having permanent magnets on bands about their necks will be able to obtain the supplemental feed, and only as much food as will be consumed at any one time will be conveyed to the feed trough 14.

FIG. 7 illustrates a variation in a circuit which may be used to control the feed motor 32. In this arrangement an induction bridge circuit is used which would be actuated by a magnetic or ferrous chain or material hung about the animal's neck. The sign wave generator 58 would be at 110 volts alternating current from the powerline which is applied across coils 52 and 54 when a metal object is brought into close proximity to coil 54 which is mounted in panel 18. The inductance bridge 60 is thereby unbalanced and feeds a signal to the tuned amplifier generally indicated at 56. This amplifier magnifies the 60-cycle signal and filters out undesirable harmonics. The AC to DC detector circuit 62 changes the 60-cycle signal to direct current which flows through coil 64. This coil is disposed adjacent and actuates a reed switch relay 66 which actuates the thyrsistor 68 similar to that shown in FIG. 6, and the thyrsistor switches the power to the motor 32. Thus, this circuit does not require the use of a permanent magnet, but merely requires that a ferrous material be hung about the animal's neck.

Figure 8:
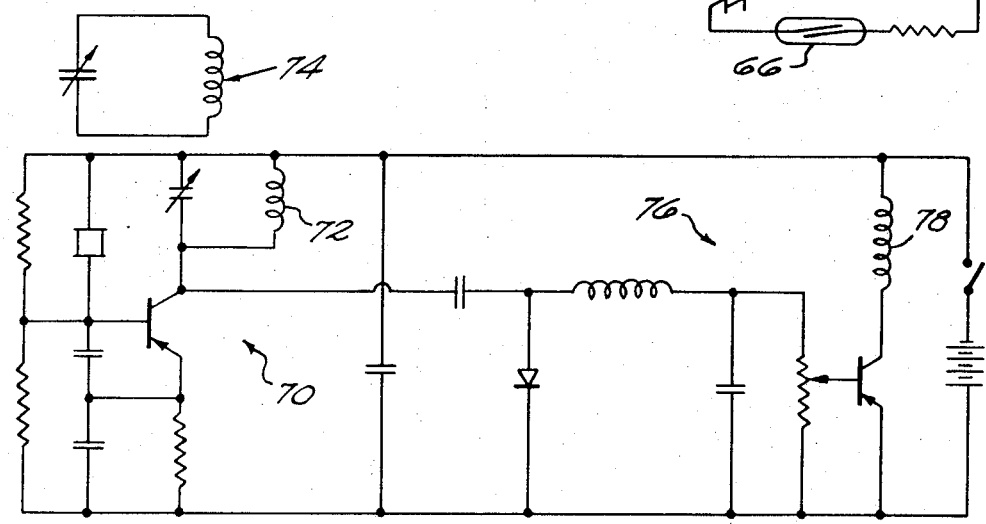
FIG. 8 is a circuit diagram of a radio frequency absorption-type circuit used in conjunction with the invention.

The circuit of FIG. 8 is a radio frequency absorption circuit whereby an RF generator generally indicated at 70 generates a high frequency alternating current in coil 72. Coil 72 is the sensing coil which is located at the panel 18. A remote tuned circuit 74 is a tuned circuit device contained in a small housing hung from the animal's neck. When the tuned circuit 74 is tuned to the same frequency as the RF generator 70, and is brought into close proximity to the coil 72, the tuned circuit absorbs some of the RF energy developed by the generator 70. When the output of the generator drops the DC detector 76 measures this difference by a drop in the current in coil 78 and the coil 78 operates a reed switch and thyrsistor circuit similar to and in the manner shown in FIG. 7.

In that a radio frequency absorption circuit system requires a specially tuned remote circuit to permit energization of the motor 32 it is possible to use this type of system to provide a multiple feed arrangement. For instance, a feed reservoir could be used having four separate compartments each containing a different feed. A separate motor 32 and feed conveying system is used with each compartment and all of the conveyors supply a single feed trough 14. The panel 18 contains four different sensing coils, each coil being a part of a separate generating circuit, and each circuit controlling one motor 32. The animals to be supplementally fed would have one of four differently turned remote circuits suspended from its neck and thus selected animals can be fed the desired feed. As an animal inserts its head into the trough 14, only that motor 32 and conveyor system is energized which responds to the particular tuned circuit carried by that animal.

Figure 9:
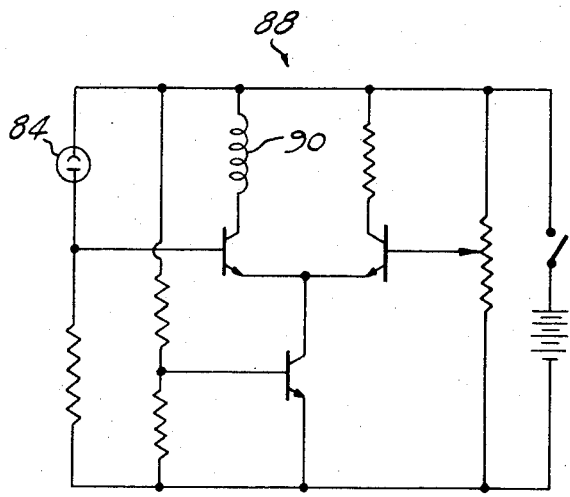
FIG. 9 is a circuit diagram of a heat radiation sensing circuit in accord with the invention.
Figure 10:
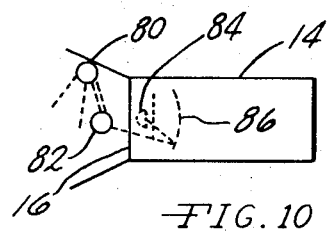
FIG. 10 is a schematic view of the arrangement of the heat source components used with the circuit of FIG. 9.

FIG. 9 and 10 are directed to a heat radiation sensitive circuit for detecting the presence of the desired animal at the feed trough 14. In this circuit an infrared heat source 80 is located adjacent the feed trough. An infrared heat source reflector 82 is hung from a band about the animal's neck, and an infrared-sensitive photo cell 84 is also located adjacent the feed trough at the focus of a reflector 86. When the animal with the reflector 82 places its head within the feed trough the reflectors 82 and 86 will reflect infrared into the photo cell 84 which will cause a signal in the amplifier circuit 88, FIG. 9, to energize coil 90. The coil 90 produces a magnetic field which closes a reed switch which in turn activates a thyrsistor as in the embodiment of FIG. 7.

In addition to the disclosed variations in circuitry which may be used in the practice of the invention, it will also be apparent to one skilled in the art that a radiation detecting circuit could be employed in conjunction with a lower yield radioactive material carried about the neck of the animal. Likewise, other proximity-type circuits could be used in the practice of the inventive concept.

It is understood that various modifications to the disclosed embodiments may be apparent to those skilled in the art without departing from the spirit and scope of the invention, and it is intended that the invention be defined and limited only by the following claims:

I claim:

1. A selective animal feeder system comprising, in combination, a feed container, a feed trough having an access opening, electrically energized feed transfer means selectively transferring feed from said container to said trough during energization of said transfer means, proximity operated feed transfer control means having a sensing element comprising a magnetically responsive reed switch located adjacent said trough access opening, and a feed transfer control actuating member comprising a permanent magnet adapted to be worn by the animal to be fed for initiating and maintaining continued operation of said feed transfer control means upon the animal inserting and maintaining the presence of its head in said trough through said access opening, said actuating member when disposed adjacent said sensing element causing energization of said transfer means to transfer feed from the container into said trough.

2. In a selective animal feeder system as in claim 1 wherein said transfer means includes an electric motor, and a feed conveyor connecting with said container and said trough operated by said motor.

3. In a selective animal feeder system as in claim 1 wherein said trough includes a panel disposed below said access opening, said sensing element being located adjacent said panel, and said actuating member being mounted on a band placed about the animal's neck.

4. In a selective animal feeder system as in claim 3 wherein a panel is disposed below said access opening, said control means including a plurality of magnetically responsive reed switches comprising said sensing element mounted on said panel.

5. A selective animal feeder system comprising, in combination, a feed container, a feed trough having an access opening, electrically energized feed transfer means selectively transferring feed from said container to said trough during energization of said transfer means, at least one magnetically responsive feed transfer means control switch located adjacent said trough access opening, and a permanent magnet adapted to be worn by the animal to be fed constituting a switch activating means for actuating and maintaining operation of the feed transfer means to present feed to the feed trough and animal only upon the continued insertion of the animal's head into the access opening adjacent said switch.

6. In a selective animal feeder system as in claim 5 wherein a plurality of magnetically responsive feed transfer means control switches are located adjacent said trough access opening, said switches being connected in parallel with respect to each other whereby each switch is capable of controlling said feed transfer means.